US009481359B2

(12) United States Patent
Morisaki

(10) Patent No.: US 9,481,359 B2
(45) Date of Patent: Nov. 1, 2016

(54) VEHICLE CONTROL DEVICE

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/818,957

(22) Filed: Aug. 5, 2015

(65) Prior Publication Data
US 2016/0114786 A1 Apr. 28, 2016

(30) Foreign Application Priority Data

Oct. 28, 2014 (JP) ................. 2014-219057

(51) Int. Cl.
| | |
|---|---|
| *B60L 9/00* | (2006.01) |
| *B60W 20/00* | (2016.01) |
| *B60W 10/06* | (2006.01) |
| *B60W 10/08* | (2006.01) |
| *B60W 10/26* | (2006.01) |
| *B60W 50/00* | (2006.01) |
| *B60L 11/18* | (2006.01) |
| *B60K 6/445* | (2007.10) |
| *B60W 30/18* | (2012.01) |

(52) U.S. Cl.
CPC .......... *B60W 20/1062* (2013.01); *B60K 6/445* (2013.01); *B60L 11/1862* (2013.01); *B60W 10/06* (2013.01); *B60W 10/08* (2013.01); *B60W 10/26* (2013.01); *B60W 20/108* (2013.01); *B60W 20/12* (2016.01); *B60W 20/14* (2016.01); *B60W 30/18127* (2013.01); *B60W 50/0097* (2013.01); *B60W 2510/244* (2013.01); *B60W 2550/12* (2013.01); *B60W 2550/13* (2013.01); *B60W 2550/143* (2013.01); *B60W 2550/402* (2013.01); *B60W 2710/244* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2013/0289815 A1 | 10/2013 | Suzuki | |
| 2015/0134174 A1* | 5/2015 | Preece | ................. H01M 10/44 701/22 |
| 2016/0019792 A1* | 1/2016 | Kawamata | .......... B60R 16/0236 701/70 |

FOREIGN PATENT DOCUMENTS

JP 2012-147554 A 8/2012

* cited by examiner

*Primary Examiner* — Adam Alharbi
(74) *Attorney, Agent, or Firm* — Oliff PLC

(57) ABSTRACT

When an air density is relatively low and a predicted regeneration zone is present within a predetermined travel distance, a vehicle control device executes at least one of the following: i) prohibition of setting a target value of a remaining battery level to a corrected target value; and ii) prohibition of control of an engine and a motor based on the corrected target value.

5 Claims, 5 Drawing Sheets

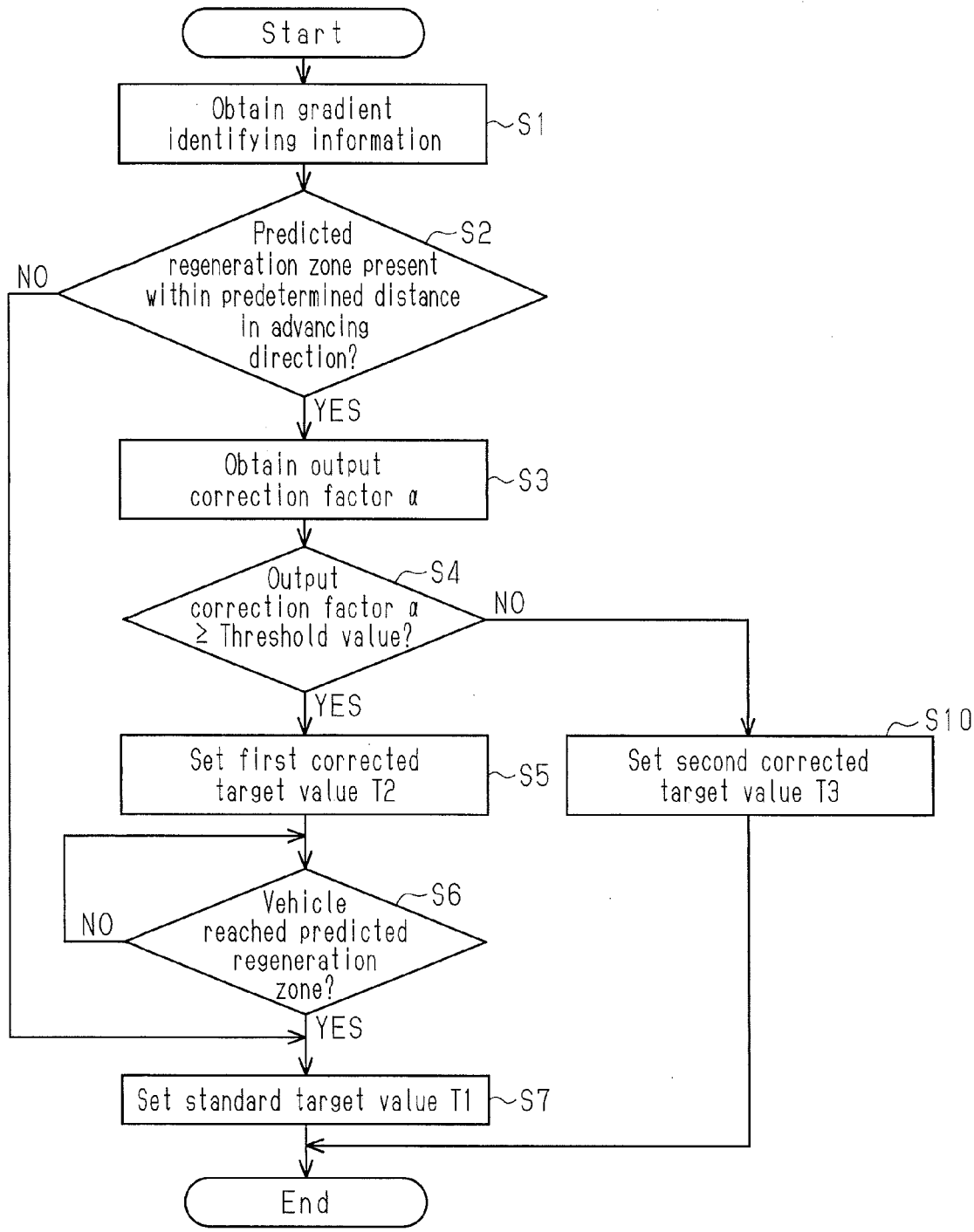

VEHICLE CONTROL DEVICE

BACKGROUND OF THE DISCLOSURE

The present disclosure relates to a vehicle control device that controls a vehicle that uses an internal combustion engine and a motor as drive sources.

A hybrid vehicle, which uses an internal combustion engine and a motor as drive sources, performs regenerative braking, in which the motor functions as a generator, for example, during deceleration.

Recently, regarding hybrid vehicles, techniques have been proposed for adjusting the remaining battery level of an electricity storage device in a well-planned manner by using information related to a driving environment. For example, Japanese Laid-Open Patent Publication No. 2012-147554 discloses a vehicle control device that sets a lower a target value of the state of charge (SOC), which indicates the remaining battery level, when it is predicted that regenerative braking will take place in the advancing direction of the vehicle and it is determined that acceleration is unlikely to be performed. Such a lower target value allows the remaining battery level to be reduced in advance prior to performance of regenerative braking, so that the remaining battery level will be increased at the execution of regenerative braking. This improves the energy efficiency of the vehicle.

However, when a hybrid vehicle travels at high altitudes, such as in mountains, low air densities in such driving environments result in lowered engine output, and the SOC of the electricity storage device may not change as predicted by the above described control device. Thus, the control performed by the above described vehicle control device is not necessarily effective.

Accordingly, it is an objective of the present disclosure to provide a vehicle control device that is capable of properly adjusting the remaining battery level of an electricity storage device in accordance with the driving environment of the vehicle.

SUMMARY

In accordance with one aspect of the present disclosure, a vehicle control device that controls a vehicle is provided. The vehicle includes an internal combustion engine, which functions as a drive source, a motor, which is capable of regenerating electricity and functions as a drive source, an electricity storage device, which is a drive source of the motor and is configured to be charged by regenerated electricity. The vehicle control device includes a predicted regeneration zone determining section circuitry, which is configured to determine whether a predicted regeneration zone, in which regenerative braking is predicted, is present in an advancing direction of a vehicle. The predicted regeneration zone determining section circuitry is configured to determine whether the predicted regeneration zone is present within a predetermined travel distance from a position of the vehicle. The vehicle control device is configured to compare an air density determination value, which is a variable related to an air density, with a threshold value. The vehicle control device is configured such that, when the predicted regeneration zone is not present within the predetermined travel distance, the vehicle control device controls the engine and the motor based on a standard target value of a remaining battery level of the electricity storage device. The vehicle control device is configured such that, when the air density, which is determined based on the air density determination value, is relatively high, and the predicted regeneration zone is present within the predetermined travel distance from the position of the vehicle, the vehicle control device controls the engine and the motor based on a corrected target value of the remaining battery level of the electricity storage device. The corrected target value is lower than the standard target value. The vehicle control device is configured such that, when the air density, which is determined based on the air density determination value, is relatively low, and the predicted regeneration zone is present within the predetermined travel distance from the position of the vehicle, the vehicle control device executes at least one of the following:

i) prohibition of setting the target value of the remaining battery level to the corrected target value; and ii) prohibition of control of the engine and the motor based on the corrected target value.

In a normal driving environment, control of the vehicle increases electricity consumption before the vehicle reaches a predicted regeneration zone. In contrast, in a driving environment with a low air density, the output of the motor may be increased for compensating for the output of the internal combustion engine or the power of the internal combustion engine that is used for generating electricity using the motor may be insufficient. This can lower the remaining battery level to a level below the permissible range. Thus, in the above described configuration, in a case in which a predicted regeneration zone exists within a predetermined travel distance from the vehicle, if the air density, which is determined based on the air density determination value, is relatively low, either the target value of the remaining battery level is prohibited from being set to the corrected target value for increasing the electricity consumption before reaching the predicted regeneration zone or the engine and the motor are prohibited from being controlled based on the corrected target value. This restrains the remaining battery level from falling below the permissible range, so that the remaining battery level is properly adjusted in accordance with the driving environment.

The vehicle control device is preferably configured such that, when the air density, which is determined based on the air density determination value is relatively low, and the predicted regeneration zone is present within the predetermined travel distance from the position of the vehicle, the vehicle control device sets the target value of the remaining battery level to a value that is greater than the corrected target value and less than the standard target value and controls the engine and the motor based on the target value.

With this configuration, even if the air density, which is determined based on the air density determination value, is relatively low, the target value of the remaining battery level is lowered if a predicted regeneration zone exists within the predetermined travel distance from the position of the vehicle. At this time, the target value is set to a value higher than a corrected target value that is set when a predicted regeneration zone exists and the air density is relatively high. Thus, the configuration prevents remaining battery level from falling below the permissible range while improving the fuel efficiency by consuming electricity before the vehicle reaches the predicted regeneration zone.

The vehicle control device is preferably configured such that, as the air density, which is determined based on the air density determination value, is lowered, the vehicle control device changes the target value to be increased between the standard target value and the corrected target value.

With this configuration, since the target value varies in accordance with the air density, the remaining battery level is restrained from falling below the permissible range while being adapted to be suitable for changes in the driving environment.

The vehicle control device is preferably configured to calculate the air density determination value based on a physical quantity, which is includes at least one of an air temperature and an atmospheric pressure.

With this configuration, since the air density determination value is calculated by using a physical quantity that is a variation factor of the air density, the accuracy of the air density determination value is increased. Thus, the target value of the remaining battery level is set properly.

The vehicle control device is preferably configured to set the target value of the remaining battery level to the standard target value when the vehicle reaches the predicted regeneration zone.

With this configuration, if the target value has not been changed when the vehicle reaches a predicted regeneration zone, the target value is maintained. The corrected target value, which has been set before the vehicle reaches the predicted regeneration zone, is returned to the standard target value. This prevents the energy generated by the regenerative braking from being converted into heat and lost.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7 is a flowchart showing a procedure in which the vehicle control device of FIG. 6 adjusts a remaining battery level in relation to the predicted regeneration zone.

DESCRIPTION OF THE PREFERRED EMBODIMENTS

A vehicle control device according to a first embodiment will now be described. In the present embodiment, description will be given assuming that the vehicle is a hybrid vehicle, which is capable of charging an electricity storage device using the power of the internal combustion engine and regenerative braking.

Figure 1:
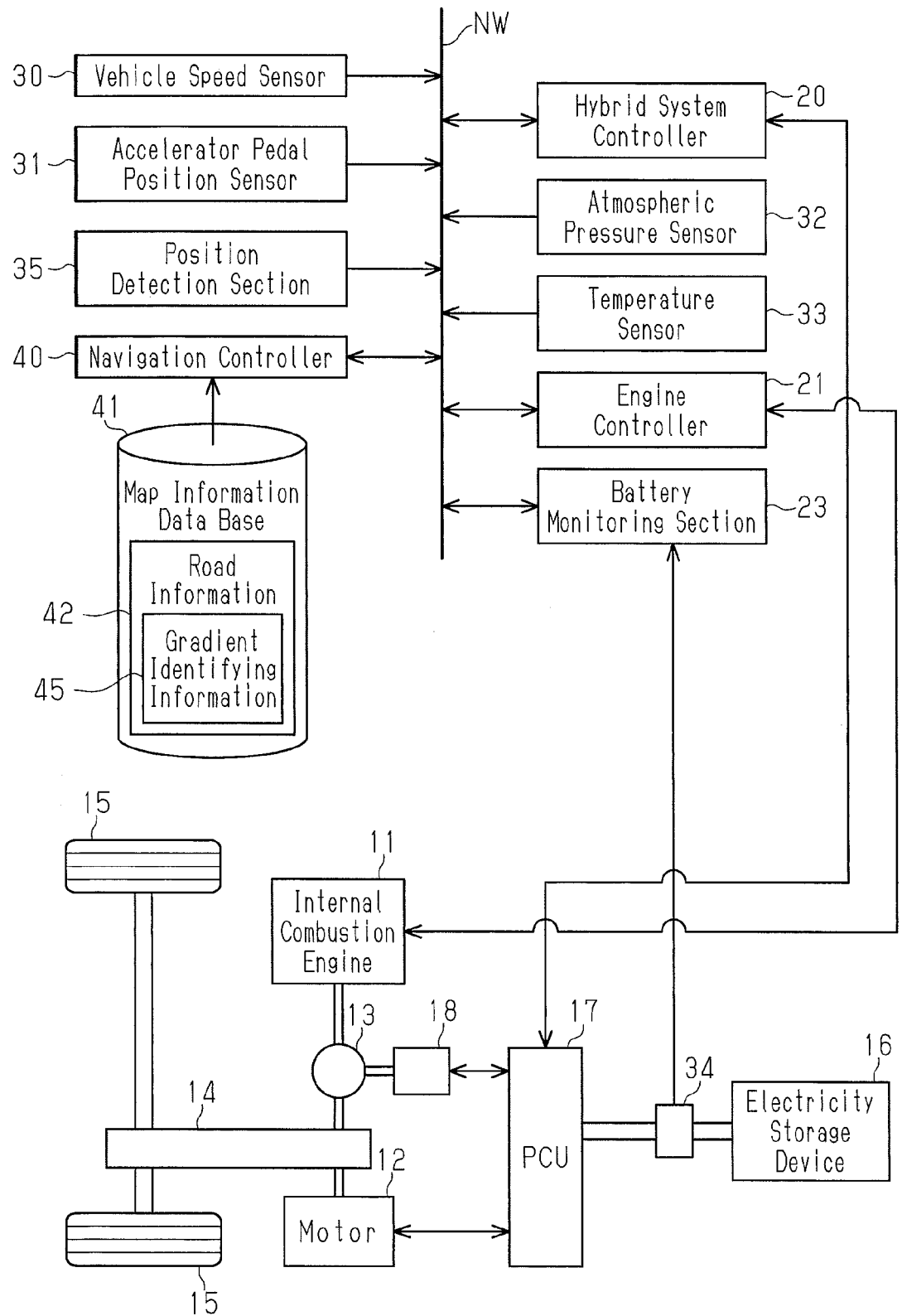
FIG. 1 is a block diagram schematically showing a vehicle on which a vehicle control device according to a first embodiment of the present disclosure is mounted.

As shown in FIG. 1, the vehicle includes an internal combustion engine 11 and a motor 12 as drive sources. The engine 11 is mechanically coupled to drive wheels 15 via a power split mechanism 13 and a speed reducing mechanism 14. The motor 12 receives electricity from an electricity storage device 16, which is a drive source, via a power control unit (PCU) 17, which includes an inverter section circuitry and a converter section circuitry. The electricity storage device 16 is a rechargeable battery. The motor 12 is coupled to the drive wheels 15 via the speed reducing mechanism 14. The motor 12 is capable of performing regenerative braking to generate electricity using power transmitted from the drive wheels 15.

The engine 11 is coupled to a generator 18 via the power split mechanism 13. The generator 18 converts some of the power of the engine 11 into electricity. The electricity generated by the generator 18 can be supplied to the electricity storage device 16 via the PCU 17.

The vehicle control device includes a hybrid system controller 20 and a navigation controller 40, which functions as a predicted regeneration zone determining section circuitry. The hybrid system controller 20 and the navigation controller 40 are electrically connected to each other via an on-vehicle network NW. The hybrid system controller 20 is electrically connected to the PCU 17 via the on-vehicle network NW and the like.

The hybrid system controller 20 includes an arithmetic unit, memory units, and the like. The memory units such as a ROM of the hybrid system controller 20 store programs for controlling the engine 11 and the motor 12. In accordance with the programs, the arithmetic unit calculates required output values for the engine 11 and the motor 12 and outputs the calculated required output values to the engine controller 21 and the PCU 17.

The hybrid system controller 20 inputs a vehicle speed, which is the rotation speed of a vehicle wheel, from a vehicle speed sensor 30, and an accelerator pedal position, which is the degree of depression of the accelerator pedal, from an accelerator pedal position sensor 31. The hybrid system controller 20 inputs signals such as a shift position signal from a shift position sensor (not shown). The hybrid system controller 20 calculates a required output that indicates the drive force required by the driver based on the accelerator pedal position, the shift position, and the like.

Further, the hybrid system controller 20 inputs, via the on-vehicle network NW, an outside atmospheric pressure Prs from an atmospheric pressure sensor 32 and an outside air temperature Tmp from a temperature sensor 33. The atmospheric pressure sensor 32 and the temperature sensor 33 may be the intake pressure sensor and the intake temperature sensor located in the intake passage of the engine 11 or sensors other than these.

The hybrid system controller 20 is electrically connected to a battery monitoring section circuitry 23 via the on-vehicle network NW. The battery monitoring section circuitry 23 is connected to a current sensor 34, which detects the magnitude of current supplied to the electricity storage device 16 and the magnitude of current output from the electricity storage device 16. The battery monitoring section circuitry 23 receives the detected values from the current sensor 34. The battery monitoring section circuitry 23 calculates the SOC of the electricity storage device 16 by using the detected values of the current sensor 34 and the like. The battery monitoring section circuitry 23 outputs the SOC of the electricity storage device 16 to the hybrid system controller 20 via the on-vehicle network NW.

With the goal of maintaining the SOC of the electricity storage device 16 at or about a predetermined target value, the hybrid system controller 20 calculates required output values such as rotation speed and output of the engine 11 and required output value such as output of the motor 12 based on the output required by the driver and the SOC of the electricity storage device 16. The target value of the SOC is set between the lower limit value of the electricity storage device 16 and 100%, which indicates the fully charged state. Specifically, the target value is set to such a value that drive force in accordance with the vehicle driving state is obtained and electricity is efficiently recovered through regenerative braking.

The hybrid system controller 20 outputs the required output value for the engine 11 to the engine controller 21 and the required output value for the motor 12 to the PCU 17. Accordingly, driving with only the power of the engine 11, driving with only the power of the motor 12, driving with the power of the engine 11 and the power of the motor 12, and regenerative braking by the motor 12 are performed.

To maintain the SOC of the electricity storage device 16 at or about the target value, the hybrid system controller 20 causes some of the power of the engine 11 to be transmitted to the generator 18 when the remaining battery level tends to be insufficient. When receiving power, the generator 18 generates electricity and charges the electricity storage device 16. At deceleration or braking, the hybrid system controller 20 transmits power of the drive wheels 15 to the motor 12. When receiving power, the motor 12 generates electricity and charges the electricity storage device 16. Further, when the SOC exceeds the target value, the hybrid system controller 20 drives the motor 12 to actively consume electricity, thereby improving the fuel efficiency.

The navigation controller 40 will now be described. The navigation controller 40 includes an arithmetic unit, memory units, and the like. The memory units of the navigation controller 40 store programs for controlling the vehicle in cooperation with the hybrid system controller 20.

The navigation controller 40 is connected to a position detection section 35 via the on-vehicle network NW and inputs detected position data for detecting the position of the vehicle from the position detection section 35. The position detection section 35 includes one or more sensors, which include at least one of a positioning sensor, which receives wireless signals from a satellite navigation system, a direction sensor such as a gyroscope, and a communication device, which receives wireless signals through vehicle-to-vehicle communication or road-to-vehicle communication. For example, the navigation controller 40 calculates the vehicle position by combining the satellite navigation based on positioning signals from a positioning sensor and self-contained navigation based on the vehicle speed and the orientation.

The navigation controller 40 obtains road information 42 stored in a map information data base 41. The road information 42 includes node information related to nodes set at intersections and branch points and link information related to links connecting nodes. When an occupant sets a departure place and a destination using an input operation section (not shown), the navigation controller 40 searches for routes from the departure place to the destination under predetermined conditions by using the road information 42. While checking one of the searched routes and the current position against each other, the navigation controller 40 guides route using an output section such as a display and a speaker.

The road information 42 includes gradient identifying information 45 for identifying the gradient of roads. The road information 42 has altitude information as the gradient identifying information 45. The altitude information associates latitude and longitude or positional information such as links and nodes with the altitude of the target position. The altitude information also shows contour lines, which shows altitudes of terrains.

The navigation controller 40 determines presence or absence of an upward slope or a downward slope based on relative changes in the altitude indicated by the altitude information. For example, when the altitude decreases in the advancing direction, the navigation controller 40 determines that there is a downward slope. When the altitude increases in the advancing direction, the navigation controller 40 determines that there is an upward slope.

In the present embodiment, the altitude information is used as the gradient identifying information 45. However, any information can be used as long as it associates at least positional information and the direction of gradient with each other. For example, the gradient identifying information 45 may assign "1" to upward slopes and "0" to downward slopes and associate only the direction of gradient with the positional information. The gradient identifying information 45 may associate information indicating the distance and position of a zone in which the gradient is constant with the magnitude of the gradient.

Cooperative operation of the navigation controller 40 and the hybrid system controller 20 will now be described. The navigation controller 40 predicts a zone in which regenerative braking is likely to be performed by using the gradient identifying information 45. At this time, the navigation controller 40 first reads in the gradient identifying information 45 of a predetermined area in the vehicle advancing direction and determines whether there is a downward slope longer than or equal to a predetermined distance. The navigation controller 40 determines that a slope is a downward slope when the absolute value of the magnitude of downward gradient is greater than or equal to a predetermined value.

When a route from the departure place to the destination is set, the navigation controller 40 determines whether there is a downward slope that is longer than a predetermined distance exists in the vehicle advancing direction. When a route has not been set, the navigation controller 40 may determine whether there is a downward slope in the advancing direction along the current road or determine whether there is a downward slope on a frequently traveled route through learning of the traveling history.

When there is a downward slope longer than or equal to a predetermined distance in the advancing direction, regenerative braking is predicted, and regenerated electricity of a magnitude greater than or equal to a predetermined level is estimated. In this case, control for promoting consumption of electricity of the electricity storage device 16 is executed before the regenerative braking is performed. If electricity of the electricity storage device 16 is consumed in advance, the consumed electricity can be compensated for by regenerated electricity while the vehicle travels on a downward slope, while the SOC is maintained at or about the target value. This prevents the energy that is supposed to be obtained through regenerative braking from being converted into heat and lost. When the vehicle reaches the end of the downward slope, the SOC of the electricity storage device 16 is expected to reach or be close to the target value.

At low altitudes, for example, in an urban area, the navigation controller 40 adjusts the target value of the SOC to increase the electricity consumption of the electricity storage device 16 before the vehicle reaches a zone in which regenerative braking is predicted.

Figure 2:
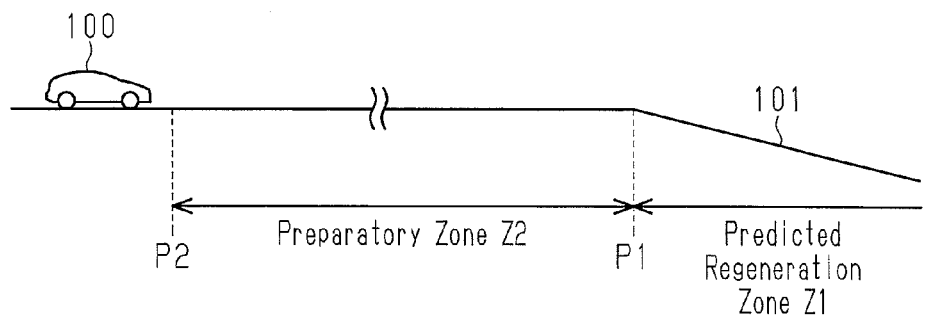
FIG. 2 is an explanatory diagram showing a zone in which regenerative braking is predicted to take place by the vehicle control device of FIG. 1 and a zone for preparation of the regenerative braking.

As shown in FIG. 2, when the vehicle 100 reaches a point P2, which is closer to the vehicle by a predetermined distance from a starting point P1 of a downward slope 101, the navigation controller 40 lowers the target value of the SOC of the electricity storage device 16. In this example, a zone from the starting point P1 to the end point (not shown) of the downward slope 101 will be referred to as a predicted regeneration zone Z1. The zone between the starting point P1 of the predicted regeneration zone Z1 and the point P2, which is closer to the vehicle by a predetermined distance, will be referred to as a preparatory zone Z2. The distance of the preparatory zone Z2, that is, the distance between the starting point P1 and the point P2 is a predetermined travel distance of vehicle 100. When the vehicle 100 is at the starting point P1, the predicted regeneration zone Z1 is located within the predetermined travel distance from the position of the vehicle 100.

Figure 3:
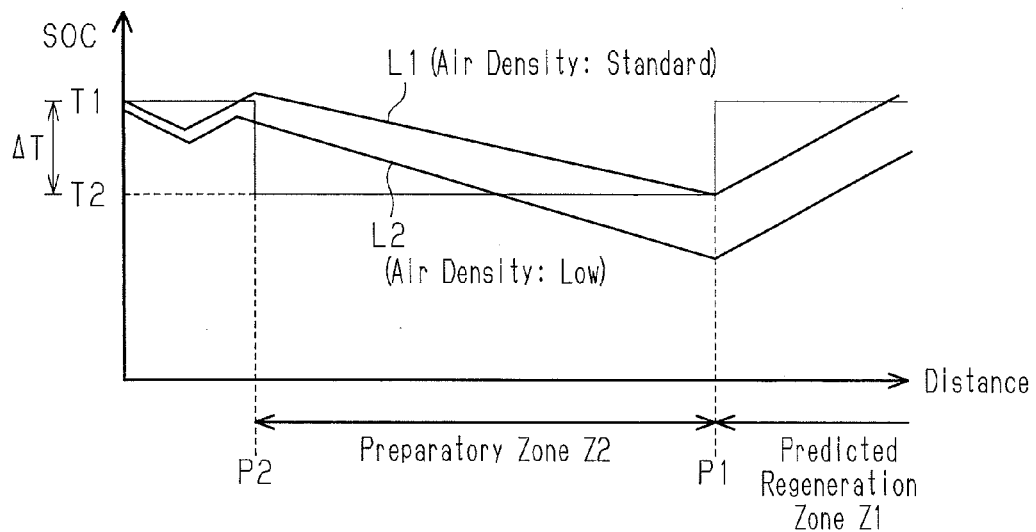
FIG. 3 is an explanatory graph showing a target value of a SOC that is set as a comparison example and an example of changes in the SOC.

As shown in FIG. 3, at the point P2, at which the preparatory zone Z2 starts, the navigation controller 40 changes the target value of the SOC from a standard target value T1, which is set when the predicted regeneration zone Z1 is not present, to a corrected target value T2, which is less than the standard target value T1. The difference ΔT between the standard target value T1 and the corrected target value T2 corresponds to, for example, an anticipated regenerated electricity. The difference ΔT may be a fixed value or varied in accordance with the magnitude of gradient or the distance for which downward gradient continues. When changing the target value of the SOC to the corrected target value T2, the navigation controller 40 outputs the corrected target value T2 or a request for changing the target value to the hybrid system controller 20.

When receiving the corrected target value T2 or the request for changing the target value, the hybrid system controller 20, for example, increases the output torque of the motor 12 under predetermined conditions. As a result, as indicated by line L1 in FIG. 3, the SOC decreases toward the corrected target value T2 as the vehicle travels in the preparatory zone Z2. The change in the SOC shown in FIG. 3 is only an example and indicates a tendency of change in the SOC.

When the vehicle reaches the starting point P1 of the predicted regeneration zone Z1, the navigation controller 40 changes the target value of the SOC from the corrected target value T2 to the standard target value T1. When inputting the standard target value T1 or a request for changing the target value, the hybrid. system controller 20 performs control for maintaining the SOC at or about the standard target value T1 if the vehicle is traveling in a normal driving environment. As a result, after the vehicle enters the predicted regeneration zone Z1, the electricity storage device 16 is charged through regenerative braking, so that the SOC increases.

The control for lowering the target value of the SOC before the vehicle reaches the predicted regeneration zone is not necessarily effective in all the driving environments. For example, at high altitudes such as mountains and in a place of a high outside temperature, the air density is low, and therefore, oxygen concentration is low, which decreases the output of the engine 11. In such an environment, if the output torque of the motor 12 is increased for compensating for reduction in the output of the engine 11, the electricity consumption is greater than that in a case in which the vehicle travels under the same traveling condition at low altitudes, and the SOC of the electricity storage device 16 is reduced. The SOC of the electricity storage device 16 is also reduced in a case in which reduction in the output of the engine 11 reduces part of the power of the engine 11 that is distributed to the generator 18 or in a case in which no power is distributed to the engine 11.

In FIG. 3, as indicated by line L2, for example, at high altitudes such as mountains, if the target value of the SOC is lowered before the predicted regeneration zone, the reduction in the target value reduces the SOC by a greater amount than that in a case in which the vehicle travels at low altitudes, in addition to reduction in the SOC due to reduction in the power of the engine 11. When the SOC is reduced greatly relative to the corrected target value T2, the SOC can fall below the permissible range during the use of the electricity storage device 16. Since the permissible range of the SOC is set from the viewpoint of prevention of output reduction of the electricity storage device 16 and prevention of deterioration, it is undesirable that the SOC fall below the permissible range.

Accordingly, in a driving environment of a low air density, the vehicle control device prohibits reduction in the target value of the SOC even if a predicted regeneration zone is present. Whether the value of the air density is calculated as a variable related to changes in the air density by the hybrid system controller 20. Normally, the output of the engine 11 is reduced as the air density is lowered. Thus, for example, the hybrid system controller 20 has an output correction factor $\alpha$ for correcting the engine output. The output correction factor $\alpha$ corresponds to an air density determination value, which is a variable related to the air density.

The output correction factor $\alpha$ is 1 when the outside atmospheric pressure Prs is in a predetermined range including a standard atmospheric pressure, which is the atmospheric pressure at sea level (1013.25 hectopascals), and the outside air temperature Tmp is within a predetermined range). When the output correction factor $\alpha$ is 1, it is predicted that the output of the engine 11 will not be reduced.

When the outside air temperature Tmp is within the predetermined range, and the outside atmospheric pressure Prs is low, the output correction factor $\alpha$ has a value less than 1 and is lowered as the outside atmospheric pressure Prs is lowered. Under a constant atmospheric pressure, the air density is lowered as the air temperature increases. Therefore, when the outside atmospheric pressure Prs is close to the standard atmospheric pressure and the outside air temperature Tmp is high, the output correction factor $\alpha$ is less than 1 and is reduced as the outside air temperature Tmp increases. When the output correction factor $\alpha$ is less than 1, it is predicted that the output of the engine 11 will be reduced compared to that in a case in which the output correction factor $\alpha$ is 1.

The hybrid system controller 20 inputs the outside air temperature Tmp and the outside atmospheric pressure Prs at a predetermined sampling interval and calculates the output correction factor $\alpha$. When changing the output correction factor $\alpha$, the hybrid system controller 20 outputs the changed output correction factor $\alpha$ to the navigation controller 40.

When inputting the output correction factor $\alpha$ from the hybrid system controller 20, the navigation controller 40 updates the output correction factor $\alpha$ stored in its own memory unit. When determining that there is a predicted regeneration zone in the vehicle advancing direction, the navigation controller 40 compares the output correction factor α with a preset threshold value for the output correction factor α. The threshold value for the output correction factor α is less than or equal to a value that corresponds to a regular air density. That is, the threshold value is set a value less than or equal to 1, which is the output correction factor α when the outside atmospheric pressure Prs is close to the standard atmospheric pressure, which is the atmospheric pressure at sea level, and the outside air temperature Tmp is within a standard range.

When the air density, which is determined based on the output correction factor α is relatively high, that is, when the output correction factor α is greater than or equal to the threshold value and the air density is in a standard state, reduction in the output of the engine 11 is not predicted. Thus, the navigation controller 40 lowers the target value of the SOC from the standard target value T1 to the corrected target value T2.

Figure 4:
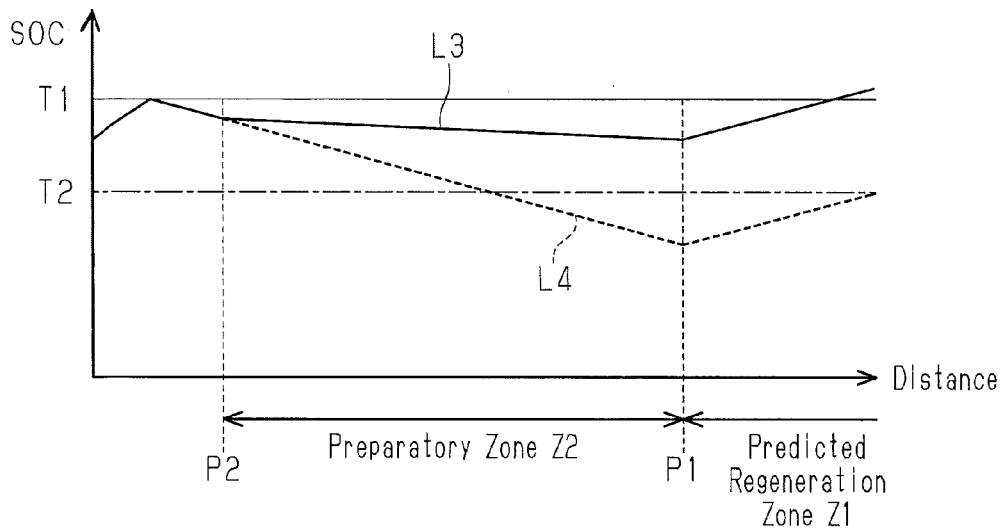
FIG. 4 is an explanatory graph showing a target value of the SOC that is set by the vehicle control device of FIG. 1 and an example of changes in the SOC.

With reference to FIG. 4, a case will be described in which the air density, which is determined based on the output correction factor α, is relatively low. When the output correction factor α is less than the threshold value and the air density is determined to be lower than the standard, the output of the engine 11 is predicted to be reduced. At this time, if the target value of the SOC is changed to the corrected target value T2, the amount of decrease is increased before the predicted regeneration zone Z1 as indicated by line L4 in FIG. 4. As a result, the SOC can fall below the permissible range.

Thus, the navigation controller 40 maintains the target value of the SOC at the standard target value T1 even if a predicted regeneration zone Z1 exists in the advancing direction. The hybrid system controller 20 drives the engine 11 and the motor 12 in accordance with the standard target value T1. Although the SOC tends to be lowered due to the reduction in the power of the engine 11 as indicated by line L3 in FIG. 4 before the predicted regeneration zone Z1, the amount of reduction in the SOC is smaller than that in a case in which the corrected target value T2 is set in the same driving condition. At this time, since the amount of reduction in the SOC is reduced, the SOC will not fall below the permissible range before the predicted regeneration zone Z1. The change in the SOC shown in FIG. 4 is only an example and indicates a tendency of change in the SOC.

When inputting the corrected target value T2 or a request for changing the target value from the navigation controller 40, the hybrid system controller 20 determines whether the output correction factor α, which the hybrid system controller 20 has calculated, is greater than or equal to the threshold value. When determining that the output correction factor α is greater than or equal to the threshold value, the hybrid system controller 20 permits the target value of the SOC to be changed and controls the engine 11 and the motor 12 based on the corrected target value T2.

In contrast, when determining that the output correction factor α is less than threshold value, the hybrid system controller 20 will not allow the target value to be changed even if inputting the corrected target value T2 or a request for changing the target value from the navigation controller 40. That is, to make the system fail safe, when the output correction factor α is less than the threshold value, change to the corrected target value T2 by the navigation controller 40 and control of the engine 11 and the motor 12 by the hybrid system controller 20 based on the corrected target value T2 are both prohibited.

Therefore, if the time at which the hybrid system controller 20 updates the output correction factor α and the time at which the target value is changed based on the output correction factor α before being updated by the navigation controller 40 coincide, and the navigation controller 40 outputs a request for changing corrected target value T2, control based on the target value before being changed is prohibited if the hybrid system controller 20 determines that the output correction factor α is greater than or equal to the threshold value.

Figure 5:
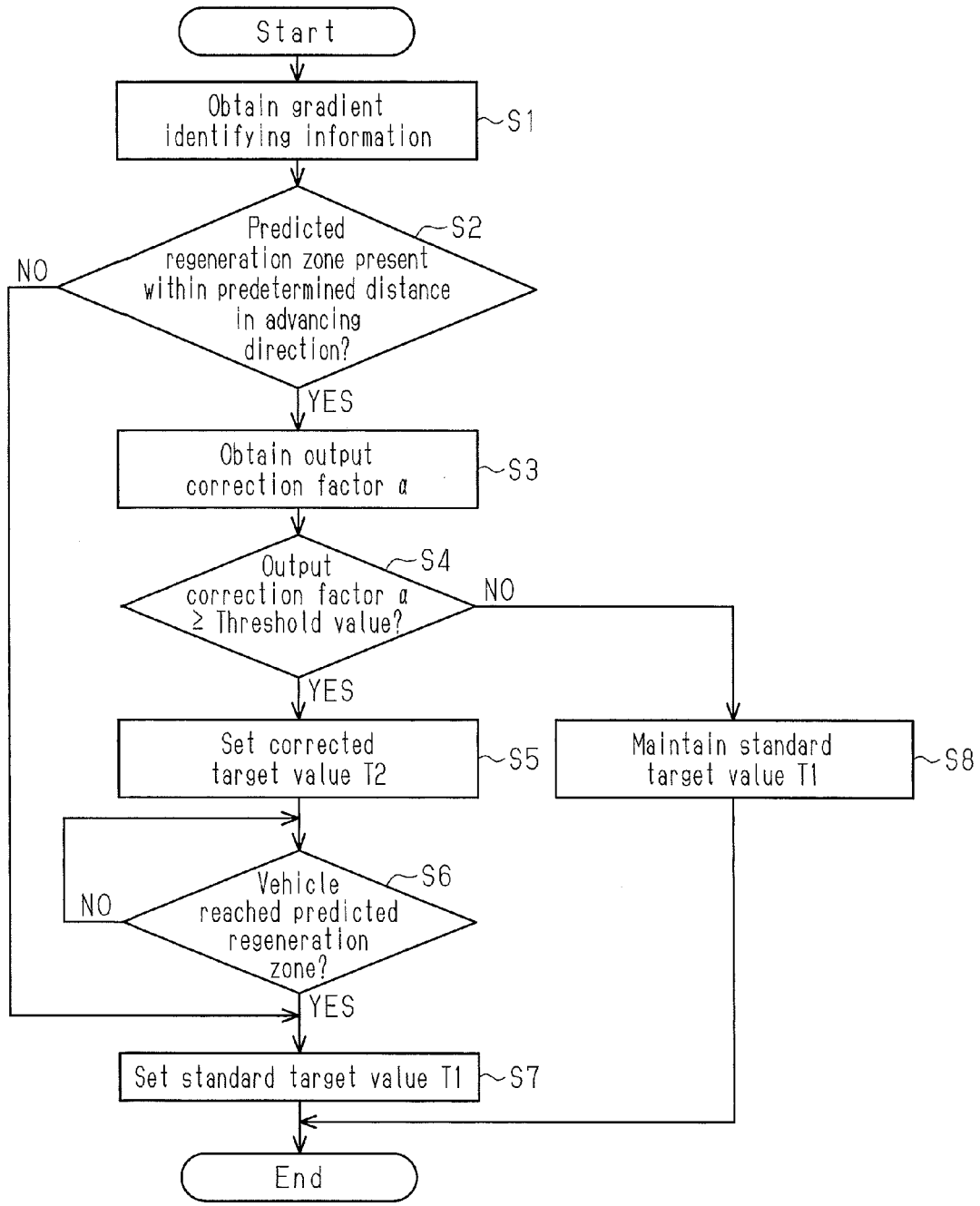
FIG. 5 is a flowchart showing a procedure in which the vehicle control device of FIG. 1 adjusts a remaining battery level in relation to the predicted regeneration zone.

With reference to FIG. 5, cooperative operation of the navigation controller 40 and the hybrid system controller 20 will now be described, together with a procedure executed thereby. A case will be described in which an occupant enters a departure place and a destination and sets a route from the departure place to the destination. In the initial state, the target value of the SOC is set to the standard target value T1.

When a route is set, the navigation controller 40 calculates the position of the vehicle at predetermined intervals based on the vehicle speed output by the vehicle speed sensor 30, the positioning signals output by the position detection section circuitry 35, and the like.

When calculating the vehicle position, the navigation controller 40 obtains the gradient identifying information 45 on the route and in the advancing direction (step S1). Using the obtained gradient identifying information 45, the navigation controller 40 determines whether the starting point of a predicted regeneration zone is present within the predetermined distance from the vehicle position in the advancing direction of the vehicle (step S2).

When determining that no predicted regeneration zone is present at step S2 (step S2: NO), the navigation controller 40 maintains the target value of the SOC at the standard target value T1 (step S7).

In contrast, when determining that a predicted regeneration zone is present at step S2 (step S2: YES), the navigation controller 40 obtains the output correction factor α, which is stored in the memory unit thereof (step S3), and determines whether the output correction factor α is greater than or equal to the threshold value (step S4). That is, the navigation controller 40 determines whether the air density, which is determined based on the output correction factor α, is relatively high.

If the output correction factor α is greater than or equal to the threshold value, that is, if the air density, which is determined based on the output correction factor α, is relatively high (step S4: YES), the air density of the environment in which the vehicle is traveling is estimated to be standard. Thus, the navigation controller 40 lowers the target value of the SOC from the standard target value T1 to the corrected target value T2 (step S5). The navigation controller 40 either outputs the corrected target value T2 as the target value of the SOC to the hybrid system controller 20 or outputs a request for changing the target value.

When inputting the specified corrected target value T2 or the request for change from the navigation controller 40, the hybrid system controller 20 accepts the request for changing the corrected target value T2 if the output correction factor α is greater than or equal to the threshold value. The hybrid system controller 20 controls the engine controller 21 and the PCU 17, accordingly. When the output correction factor α is less than the threshold value, the hybrid system controller 20 does not accept the target value output by the navigation controller 40 and controls the engine controller 21 and the PCU 17 based on the standard target value T1.

After changing the target value of the SOC, the navigation controller 40 determines whether the vehicle has reached the starting point P1 of the predicted regeneration zone Z1 (step S6). When determining that the vehicle has reached the starting point P1 of the predicted regeneration zone Z1, the navigation controller 40 changes the target value of the SOC from the corrected target value T2 to the standard target value T1 (step S7).

In contrast, when determining that the output correction factor α is less than the threshold value at step S4 (step S4: NO), the navigation controller 40 maintains the target value of the SOC at the standard target value T1 (step S8). In this case, the navigation controller 40 either does not output a target value or a request for changing the target value or outputs a request for maintaining the standard target value T1 to the hybrid system controller 20. After the vehicle reaches the starting point P1 of the predicted regeneration zone Z1, the navigation controller 40 returns to step S1 and repeat the above described procedure for the next predicted regeneration zone Z1.

When the target value of the SOC is prohibited from being lowered as described above, the hybrid system controller 20 controls the engine 11 and the motor 12 based on the standard target value T1. As a result, although the SOC of the electricity storage device 16 tends to be slightly lowered in relation to the standard target value T1 due to the fact that the air density is lower than the standard value (for example, the air density at sea level), the target value itself is not lowered. This minimizes the amount of reduction in the SOC.

As described above, the vehicle control device of the present embodiment achieves the following advantages.

(1) The hybrid system controller 20 and the navigation controller 40 perform control for increasing the electricity consumption before reaching a zone in which regenerative braking is likely to be performed. In contrast, in a driving environment with a low air density, control for increasing the electricity consumption is performed before reaching a zone in which regenerative braking is likely to be performed, either the output of the motor 12 will be increased to compensate for the output of the engine 11 or the power of the engine 11 to be used for generating electricity with the motor 12 will be insufficient. Accordingly, the SOC, which indicates the remaining battery level of the electricity storage device 16, can fall below the permissible range of the SOC. Accordingly, in a case in which a predicted regeneration zone exists within a predetermined travel distance, which is a predetermined distance, from the vehicle, if the air density, which is determined based on the output correction factor α, or the air density determination value, is relatively low, the target value of the SOC is prohibited from being changed from the standard target value T1 to the corrected target value T2 for increasing the electricity consumption before the predicted regeneration zone. When the air density, which is determined based on the output correction factor α, the hybrid system controller 20 prohibits the engine 11 and the motor 12 from being controlled based on the corrected target value T2. This restrains the SOC from falling below the permissible range before reaching the predicted regeneration zone, so that the remaining battery level is properly adjusted in accordance with the driving environment of the vehicle.

(2) Since the hybrid system controller 20 uses the outside air temperature Tmp and the outside atmospheric pressure Prs, which are physical quantities that vary the air density, to calculate the output correction factor α, the accuracy of the air density, which is estimated based on the output correction factor α, is increased. Thus, the target value of the remaining battery level is set properly.

(3) When the vehicle reaches a predicted regeneration zone, the corrected target value T2, which has been set before reaching the predicted regeneration zone, is returned to the standard target value T1. Accordingly, control is performed to maintain the SOC of the electricity storage device 16 at the standard target value T1 in the predicted regeneration zone. Thus, the amount of energy that is lost as heat is reduced in the energy obtained through the regenerative braking.

A vehicle control device according to a second embodiment will now be described. The differences from the first embodiment will be mainly discussed. The vehicle control device according to the present embodiment is identical in basic configuration to the first embodiment shown in FIG. 1. Also in other drawings, elements substantially identical to those in the first embodiment are labeled with identical symbols, and redundant descriptions thereof will not be repeated.

As in the first embodiment, when the air density, which is determined based on the output correction factor α, is relatively low, the target value of the SOC is prohibited from being set to the corrected target value T2, and the engine 11 and the motor 12 are prohibited from being controlled based on the corrected target value T2 in the present embodiment. The present embodiment is different from the first embodiment in that the target value of the SOC is set to a value that is less than the standard target value T1 and greater than the corrected target value T2, and that the engine 11 and the motor 12 are controlled based on the thus obtained target value.

Figure 6:
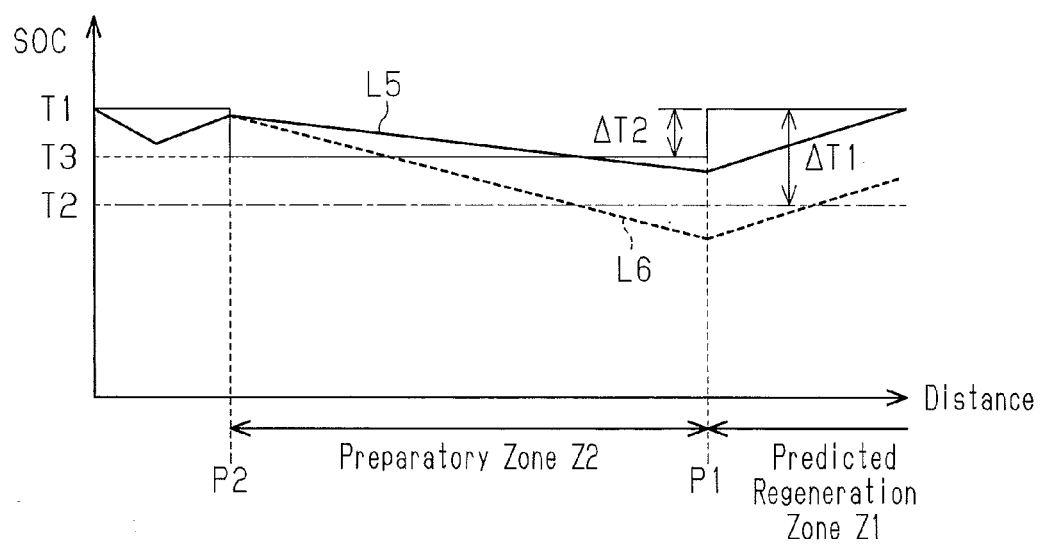
FIG. 6 is an explanatory graph showing a target value of a SOC that is set by a vehicle control device according to a second embodiment and an example of changes in the SOC.

With reference to FIG. 6, a target value of the SOC, which is set when a predicted regeneration zone is present, will be described. When a predicted regeneration zone is present within a predetermined distance in the advancing direction of the vehicle and the output correction factor α is less than the threshold value, the navigation controller 40 changes the standard target value T1 to a corrected target value T3, which is greater than the corrected target value T2 of the first embodiment. As a result, FIG. 6, the SOC takes a value between the two corrected target values T2, T3 before reaching the predicted regeneration zone Z1 as indicated by line L5 and is thus prevented from falling below the permissible range.

In contrast, if the target value of the SOC is changed to the corrected target value T2, the amount of decrease is increased as indicated by line L6 in FIG. 6. As a result, the SOC can fall below the permissible range before reaching the predicted regeneration zone Z1.

That is, in the present embodiment, the target value of the SOC is changed also in a driving environment in which the air density is relatively low. At this time, the corrected target value T3 after being changed is set to a value that is less than the standard target value T1 and greater than the corrected target value T2, which is set when the output correction factor α is greater than or equal to threshold value (the corrected target value T2<the corrected target value T3<the standard target value T1). For the illustrative purposes, the corrected target value T2, which is set when the output correction factor α is greater than or equal to the threshold value, and the corrected target value T3, which is set when the output correction factor α is less than the threshold value, are referred to as a first corrected target value T2 and a second corrected target value T3, respectively, in the following description.

The second corrected target value T3 may be a fixed value. Alternatively; the second corrected target value T3 may be changed by the navigation controller 40 in accordance with the distance or the magnitude of a downward gradient. For example, the second corrected target value T2 may be lowered to approach the first corrected target value T2 as the length of a downward slope is extended. Also, the second corrected target value T2 may be lowered to approach the first corrected target value T2 as the magnitude of a downward slope is increased.

The difference ΔT2 between the second corrected target value T3 and the standard target value T1 is less than the difference ΔT1 between the first corrected target value T2 and the standard target value T1. Thus, the fluctuation range of the SOC of the electricity storage device 16 is small compared to a case in which the first corrected target value T2 is set.

With reference to FIG. 7, cooperative operation of the navigation controller 40 and the hybrid system controller 20 will now be described, together with a procedure executed thereby. A case will be described in which a route from a departure place to a destination is set. The target value of the SOC is set to the standard target value T1.

The navigation controller 40 obtains the gradient identifying information 45, which corresponds to the position of the vehicle (step S1), and determines whether a predicted regeneration zone is present within a predetermined distance in the advancing direction of the vehicle (step S2).

When determining that a predicted regeneration zone is present (step S2: YES), the navigation controller 40 obtains an output correction factor α (step S3) and determines whether the output correction factor α is greater than or equal to the threshold value (step S4). If the output correction factor α is greater than or equal to the threshold value (step S4: YES), the navigation controller 40 changes the target value of the SOC to the first corrected target value T2 (step S5), and performs the same procedure as the first embodiment (steps S6 to S7).

In contrast, when the output correction factor α is less than the threshold value (step S4: NO), the navigation controller 40 changes the target value of the SOC to the second corrected target value T3 (step S10). At this time, the navigation controller 40 either outputs the second corrected target value T3 or outputs a request for changing the target value to the hybrid system controller 20.

The navigation controller 40 changes the target value of the SOC to the second corrected target value T3 and then determines whether the vehicle has reached the predicted regeneration zone (step S6). When determining that the vehicle has reached the predicted regeneration zone (step S6:YES), the navigation controller 40 sets the standard target value T1 (step S7).

As described above, the vehicle control device of the present embodiment achieves the following advantage, as well as the advantages (1) to (3).

(4) Even if the air density, which is determined based on the output correction factor α, is relatively low, the target value of the SOC of the electricity storage device 16 is lowered if a predicted regeneration zone exists within the predetermined travel distance from the position of the vehicle. At this time, the target value of the SOC is set to the first corrected target value T2, which is set when the output correction factor α is greater than or equal to the threshold value. Thus, the SOC is prevented from falling below the permissible range while improving the fuel efficiency by consuming electricity before reaching the predicted regeneration zone.

The above described embodiments may be modified as follows.

The second corrected target value T3 may be changed in accordance with the magnitude of the output correction factor α. The output correction factor α may be stratified into ranges, which, for example, include a range greater than or equal to 0.95 and less than 1 and a range greater than or equal to 0.9 and less than 0.95, and different values of the second corrected target value T3 may be assigned to each range. At this time, the second corrected target value T3 is increased as the output correction factor α is decreased. Alternatively, the second corrected target value T3 may be calculated based on an arithmetic expression that uses the output correction factor α and the target value of the SOC as variables. In this case, in a driving environment of a low air density, the second corrected target value T3 is set in accordance with the air density. Thus, the remaining battery level is restrained from falling below the permissible range while being adapted to be suitable for changes in the driving environment.

In each of the above illustrated embodiments, regarding the determination of the presence of a predicted regeneration zone, it is determined whether the starting point of a predicted regeneration zone is present within a predetermined distance from the vehicle position in the advancing direction. Other than this, it may be determined whether a predicted regeneration zone exists within a predetermined distance from the vehicle position. When the vehicle has traveled at a constant speed, it may be determined whether a predicted regeneration zone exists in a range that can be reached in a prescribed time in the advancing direction of the vehicle.

The output correction factor α is used for correcting the output of the engine 11, but may be used for correcting any parameter that is related to the engine 11 and changes its value according to the air density. For example, the output correction factor α may be used for correcting a fuel injection amount for maintaining the air-fuel ratio of air-fuel mixture of the engine 11 within a proper range.

In each of the above illustrated embodiments, the hybrid system controller 20 calculates the output correction factor α. However, the navigation controller 40, the engine controller 21, or any other arithmetic unit may calculate the output correction factor α.

In each of the above illustrated embodiments, when the output correction factor α is less than the threshold value, that is, when the air density is low, the navigation controller 40 prohibits the target value of the SOC from being lowered or reduces the amount by which the target value is lowered. Alternatively, only the hybrid system controller 20 may adjust the target value of the SOC, which corresponds to the air density. For example, when a predicted regeneration zone is present in the advancing direction of the vehicle, the navigation controller 40 may set the corrected target value T2 based on the gradient identifying information 45 and outputs the corrected target value T2 to the hybrid system controller 20 regardless of the value of the air density. When inputting the corrected target value T2 from the navigation controller 40, the hybrid system controller 20 compares the output correction factor α with the threshold value to determine whether to execute control based on the corrected target value T2. That is, when the output correction factor α is less than the threshold value, the hybrid system controller 20 prohibits the engine 11 and the motor 12 from being controlled based on the corrected target value T2. When the output correction factor α is greater than or equal to threshold value, the hybrid system controller 20 permits the engine 11 and the motor 12 to be controlled based on the corrected target value T2.

In each of the above illustrated embodiments, the air density is estimated from the outside air temperature Tmp and the outside atmospheric pressure Prs. However, the air density may be estimated from the altitude information and air density information (air density determination value), which associates the altitude and the air density with each other.

In each of the above illustrated embodiments, whether the air density is high is determined by comparing the output correction factor α with a single threshold value. However, two or more threshold values may be used. For example, two threshold values may be used. In this case, when the output correction factor α is less than the lower threshold value, the target value of the SOC is prohibited from being changed. When the output correction factor α is greater than or equal to the lower threshold value and less than the higher threshold value, the target value of the SOC is set to a value between the corrected target value T2 and the standard target value T1.

In each of the above illustrated embodiments, the output correction factor α is used as a variable related to the air density. However, only the outside atmospheric pressure Prs may be used as long as whether the air density is relatively high can be determined. Only the outside temperature Tmp or any other variable may be used. The air density itself may be calculated by using the outside air temperature Tmp, the outside atmospheric pressure Prs, and the mass of air in the standard condition, without using a variable related to the air density. That, is, the air density determination value includes, in addition to the output correction factor α, variables that indirectly indicate the air density such as the outside air temperature Tmp and the outside atmospheric pressure Prs, and the air density itself. The threshold value for determining whether the air density is relatively high is set in accordance with the air density determination value.

In each of the above illustrated embodiments, the SOC is used as a variable indicating the remaining battery level of the electricity storage device 16. However, a value obtained by multiplying the SOC by the battery capacity may be used. The remaining battery level may be estimated from the battery voltage or the battery temperature.

In each of the above illustrated embodiments, the navigation controller 40 changes the target value of the SOC, and the hybrid system controller 20 makes the final determination as to whether the SOC should be changed. Instead, when inputting the corrected target value from the navigation controller 40, the hybrid system controller 20 may control the engine 11 and the motor 12 based on the corrected target value, without determining whether to accept the corrected target value.

In each of the above illustrated embodiments, the navigation controller 40 sets the target value of the SOC. However, the hybrid system controller 20 may set the target value of the SOC by obtaining the gradient identifying information 45.

Information such as the position and the length of the predicted regeneration zone may be obtained by the vehicle control device from a server through wireless communication. The server stores information such as the position and the length of a predicted regeneration zone in a memory unit and delivers information related to the position of the vehicle delivered by the vehicle control device.

The air density about the vehicle may be obtained by the vehicle control device from a server through wireless communication. The server stores, in a memory unit, information that associates a position such as the latitude and longitude with the value of the air density and delivers information regarding the air density related to the position of the vehicle delivered by the vehicle control device.

In each of the above illustrated embodiment, the navigation controller 40 sets the target value of the SOC. However, any information processing device connectable to the on-vehicle network NW may be used. For example, a portable information terminal that is permitted to be connected to the on-vehicle network NW may be used.

In each of the above illustrated embodiments, the predicted regeneration zone is defined as a zone in which downward gradient continues for a predetermined distance or longer. However, the predicted regeneration zone may be any zone in which regenerative-braking is likely to be performed. For example, the predicted regeneration zone may be a zone in which the traffic is congested or heavy or a zone in which deceleration occurs frequently, for example, due to the shape of the road.

In each of the above illustrated embodiments, the vehicle is a hybrid vehicle, in which the power split mechanism 13 split the power of the engine 11. However, the vehicle may be any type of hybrid vehicle that has two or more drive sources. For example, the vehicle may be a hybrid vehicle that uses a clutch, instead of the power split mechanism 13, to switch between connection between the engine 11 and the drive wheels 15 and connection between the motor 12 and the drive wheels 15. The vehicle may be a hybrid vehicle having a generator that generates electricity by power transmitted from the front wheels and a generator that generates electricity by power transmitted from the rear wheels. Further, the vehicle may be a hybrid vehicle that uses the power of the engine 11 only to generate electricity or a hybrid vehicle in which the engine 11 and the motor 12 are mechanically connected to the drive wheels and that is capable of transmitting the power of the engine 11 and the motor 12 to the drive wheels in parallel.

The electricity storage device 16 may be any type of power supply device capable of charging and discharging. For example, the electricity storage device 16 may include a capacitor in addition to the rechargeable battery.

The vehicle control device may be mounted on a plug-in hybrid vehicle, which receives electricity from an external power source. In this case, the above described adjustment of the SOC before reaching a predicted regeneration zone is performed in a mode in which the plug-in hybrid vehicle maintains the SOC of the electricity storage device 16 at or about a target value.

The invention claimed is:

1. A vehicle control device that controls a vehicle, wherein the vehicle includes an internal combustion engine, which functions as a drive source, a motor, which is capable of regenerating electricity and functions as a drive source, an electricity storage device, which is a drive source of the motor and is configured to be charged by regenerated electricity, wherein the vehicle control device comprises a predicted regeneration zone determining section circuitry, which is configured to determine whether a predicted regeneration zone, in which regenerative braking is predicted, is present in an advancing direction of a vehicle, the predicted regeneration zone determining section circuitry is configured to determine whether the predicted regeneration zone is present within a predetermined travel distance from a position of the vehicle, the vehicle control device is configured to compare an air density determination value, which is a variable related to an air density, with a threshold value, the vehicle control device is configured such that, when the predicted regeneration zone is not present within the predetermined travel distance, the vehicle control device controls the engine and the motor based on a standard target value of a remaining battery level of the electricity storage device, the vehicle control device is configured such that, when the air density, which is determined based on the air density determination value, is relatively high, and the predicted regeneration zone is present within the predetermined travel distance from the position of the vehicle, the vehicle control device controls the engine and the motor based on a corrected target value of the remaining battery level of the electricity storage device, wherein the corrected target value is lower than the standard target value, and the vehicle control device is configured such that, when the air density, which is determined based on the air density determination value, is relatively low, and the predicted regeneration zone is present within the predetermined travel distance from the position of the vehicle, the vehicle control device executes at least one of the following:

i) prohibition of setting the target value of the remaining battery level to the corrected target value; and ii) prohibition of control of the engine and the motor based on the corrected target value.

2. The vehicle control device according to claim 1, wherein the vehicle control device is configured such that, when the air density, which is determined based on the air density determination value is relatively low, and the predicted regeneration zone is present within the predetermined travel distance from the position of the vehicle, the vehicle control device sets the target value of the remaining battery level to a value that is greater than the corrected target value and less than the standard target value and controls the engine and the motor based on the target value.

3. The vehicle control device according to claim 2, wherein the vehicle control device is configured such that, as the air density, which is determined based on the air density determination value, is lowered, the vehicle control device changes the target value to be increased between the standard target value and the corrected target value.

4. The vehicle control device according to claim 1, wherein the vehicle control device is configured to calculate the air density determination value based on a physical quantity, which is includes at least one of an air temperature and an atmospheric pressure.

5. The vehicle control device according to claim 1, wherein the vehicle control device is configured to set the target value of the remaining battery level to the standard target value when the vehicle reaches the predicted regeneration zone.

* * * * *